M. K. KIRILLOFF.
FLOATING STOREHOUSE.
APPLICATION FILED APR. 1, 1910.

1,066,502.

Patented July 8, 1913.

6 SHEETS—SHEET 1.

Witnesses
E. Schallinger
R. Goodstein

Inventor
Michail Kirillowitch Kiriloff
by B. Singer
Att'y

M. K. KIRILLOFF.
FLOATING STOREHOUSE.
APPLICATION FILED APR. 1, 1910.
1,066,502.
Patented July 8, 1913.
6 SHEETS—SHEET 2.
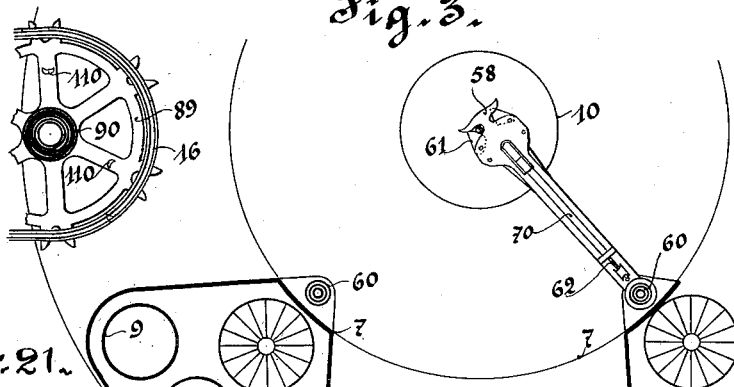
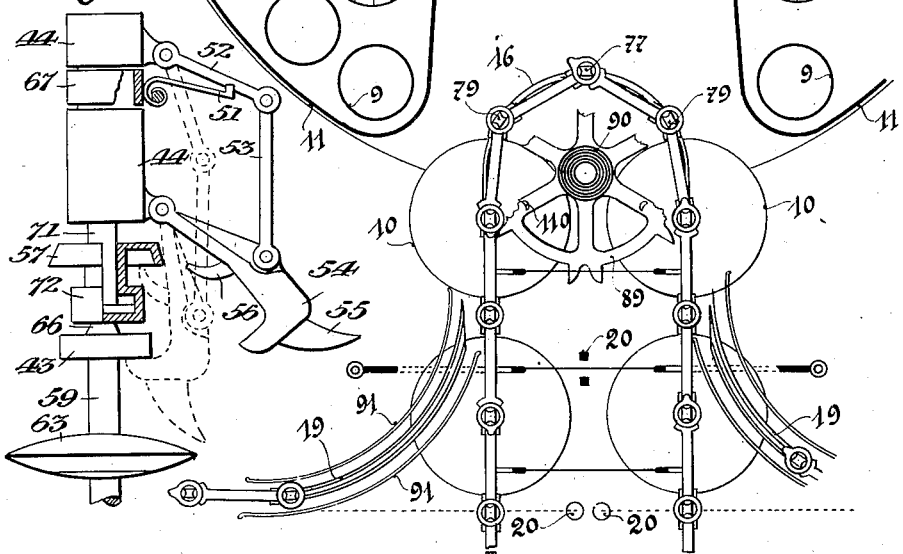
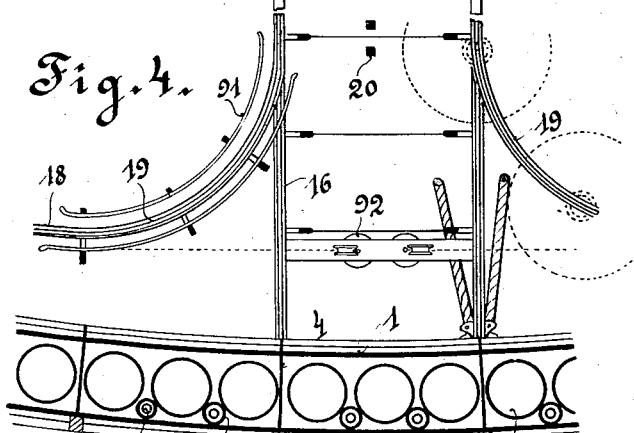
Witnesses
E. Schallinger
R. Goodstein
Inventor
Michail K. Kiriloff
by B. Singer
atty M. K. KIRILLOFF.
FLOATING STOREHOUSE.
APPLICATION FILED APR. 1, 1910.
1,066,502.
Patented July 8, 1913.
6 SHEETS—SHEET 3.
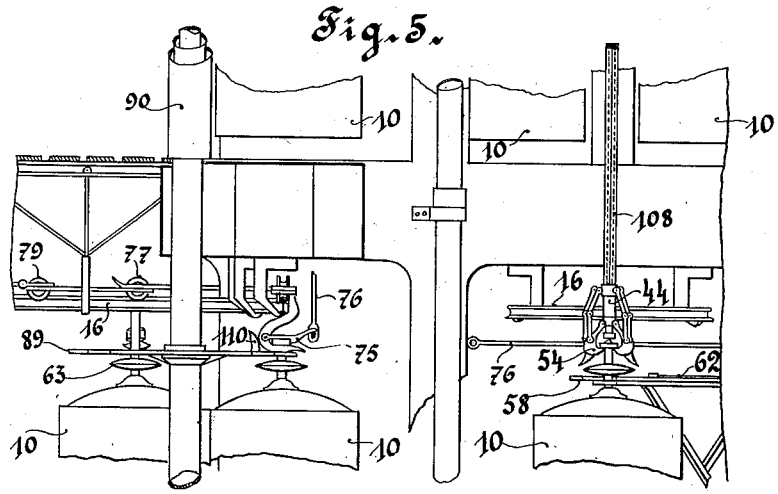
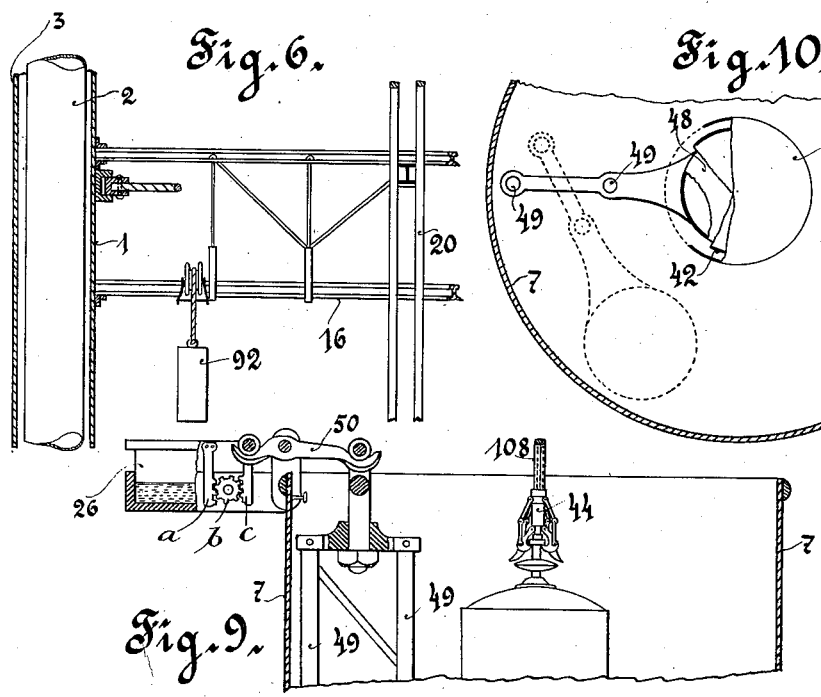
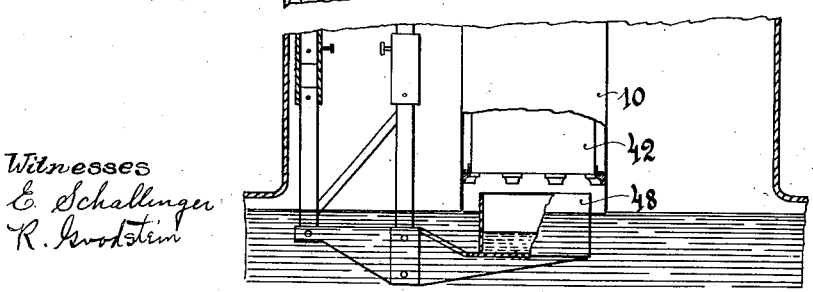

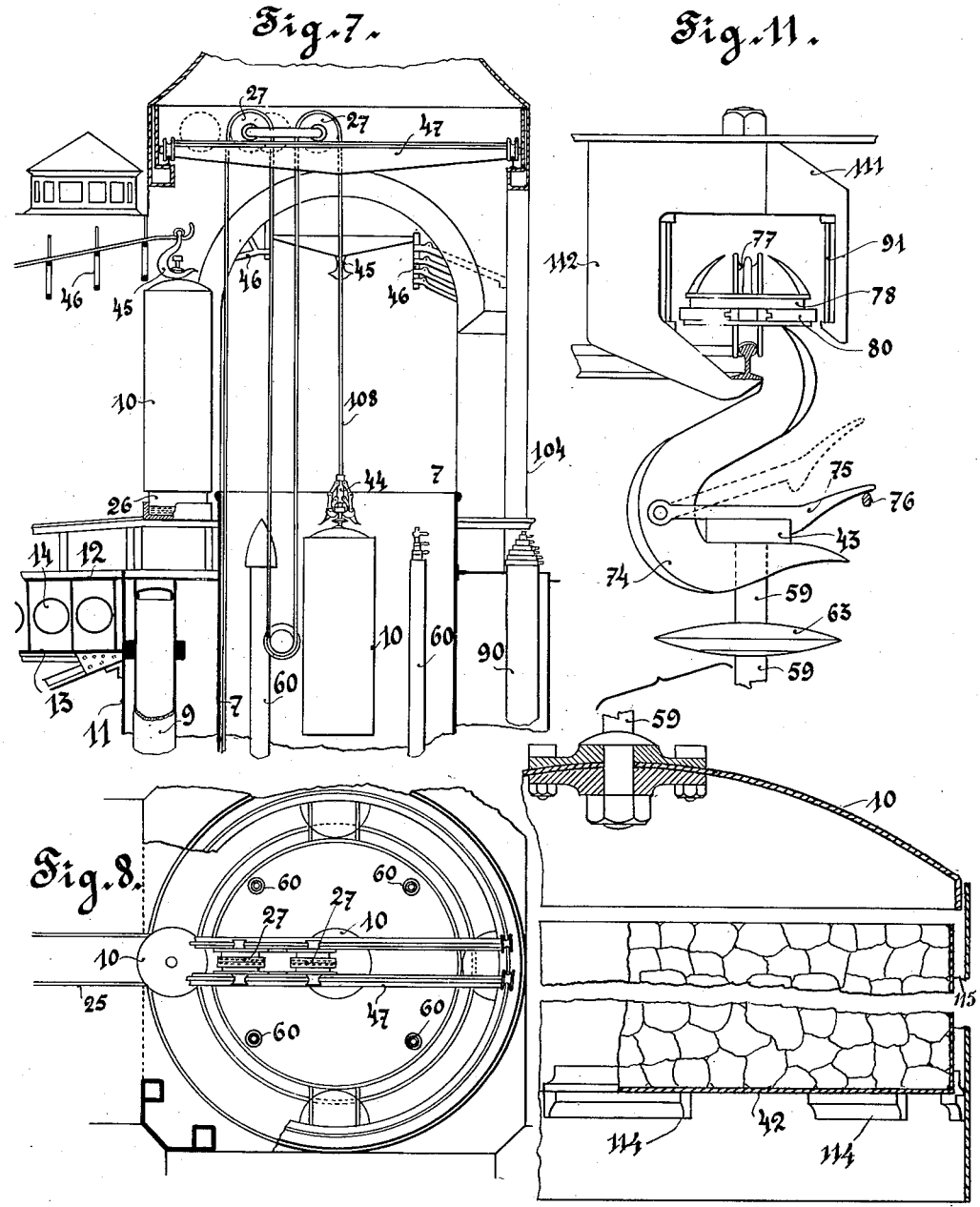

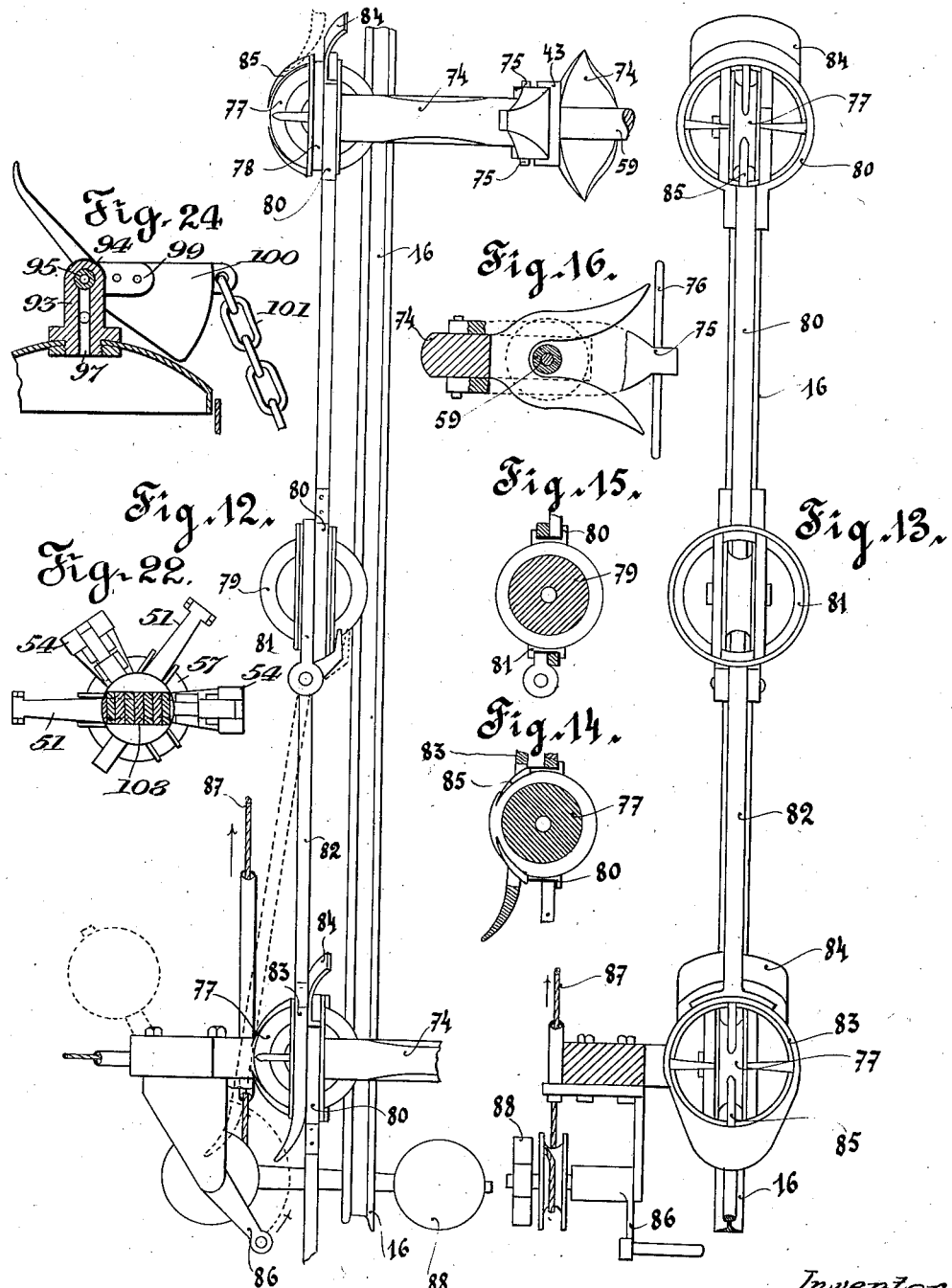

M. K. KIRILLOFF.
FLOATING STOREHOUSE.
APPLICATION FILED APR. 1, 1910.
1,066,502.
Patented July 8, 1913.
6 SHEETS—SHEET 6.
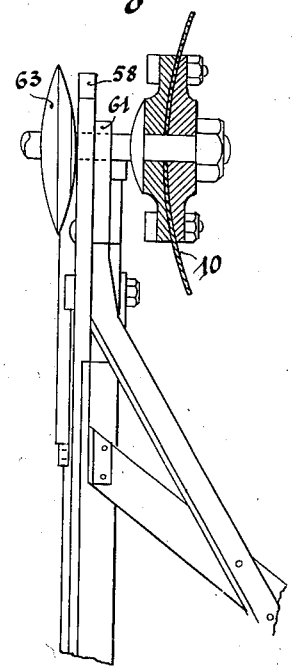
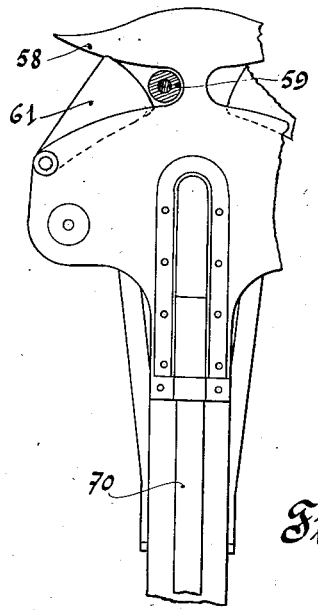
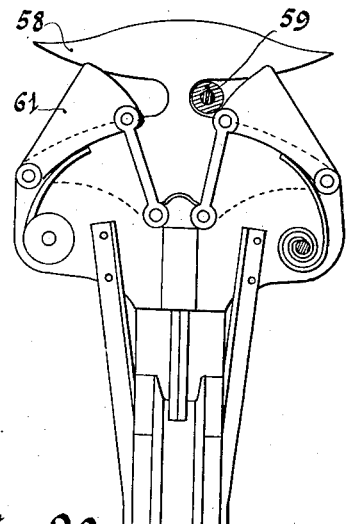
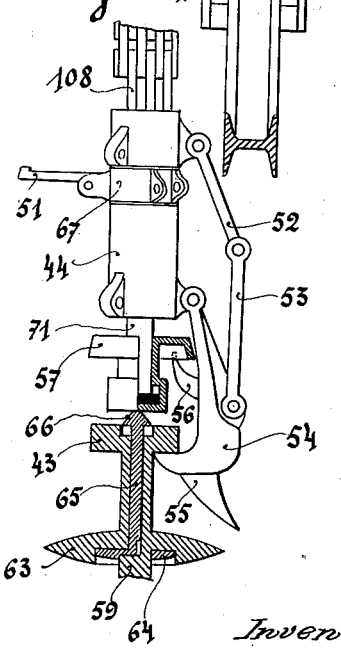
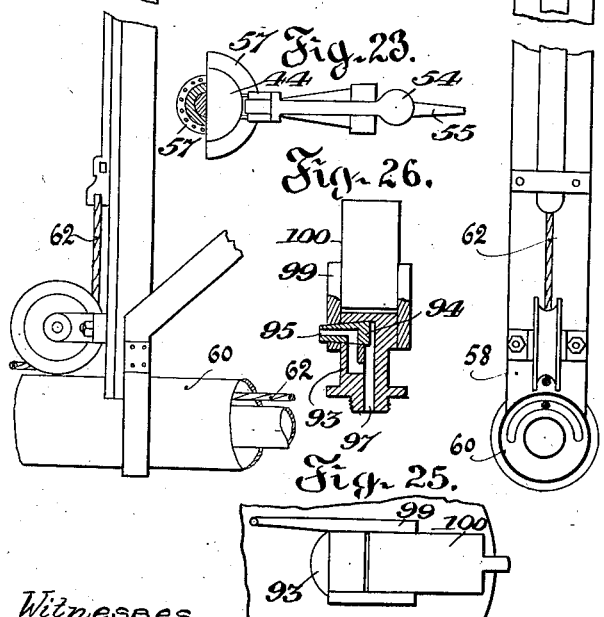
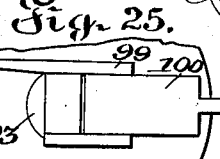

UNITED STATES PATENT OFFICE.

MICHAIL KIRILLOWITCH KIRILLOFF, OF BAKOU, RUSSIA.

FLOATING STOREHOUSE.

1,066,502.　　　　　Specification of Letters Patent.　　Patented July 8, 1913.

Application filed April 1, 1910. Serial No. 552,795.

*To all whom it may concern:*

Be it known that I, MICHAIL KIRILLOWITCH KIRILLOFF, a subject of the Czar of Russia, residing at Bakou, in the Empire of Russia, have invented a new and useful Improvement in or Relating to Floating Storehouses, of which the following is a specification.

This invention relates to floating storehouses, and more particularly to such structures as are employed for the storage of liquid and solid fuel and the like, and which may either be kept afloat on the surface of the water or sunk beneath the same by filling an outer and an inner float, as well as a space located between a double roof, and by pumping in air and pumping it out of the internal space of the structure situated beneath the roof.

In a structure in accordance with this invention the solid fuel is stored in special drums which can be transported by means of special mechanism, and the whole arrangement is such that all actions and operations can be performed and controlled by means of mechanical transmission devices from a single point located on the roof of the structure.

The accompanying drawings illustrate, by way of example, a form of structure for the storage of fuel and goods in accordance with this invention.

Figure 1:
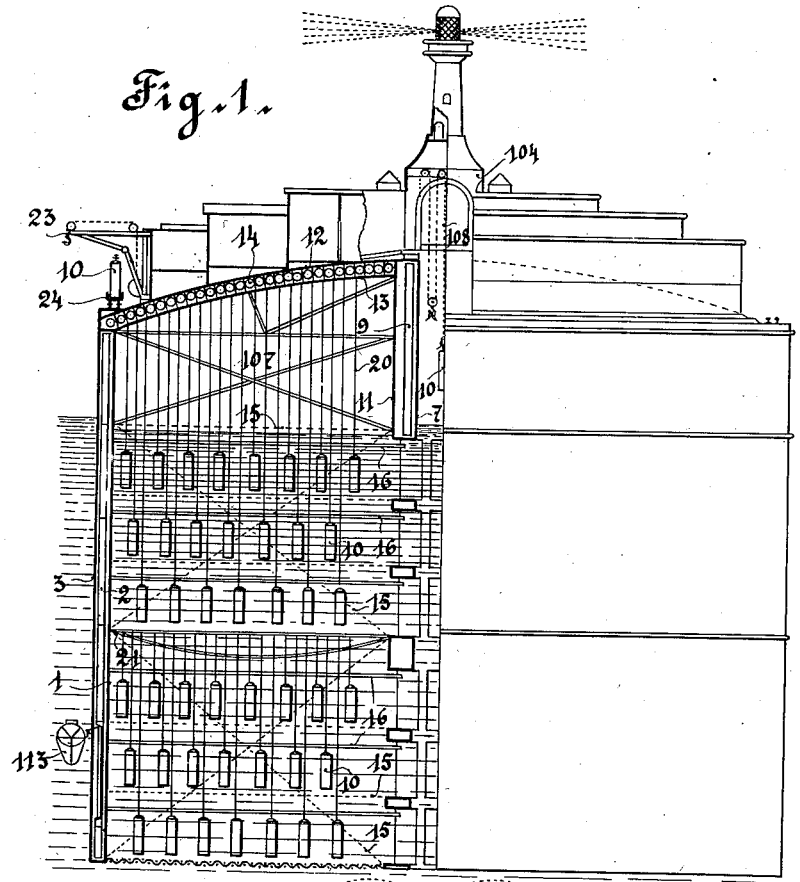
Figure 2:
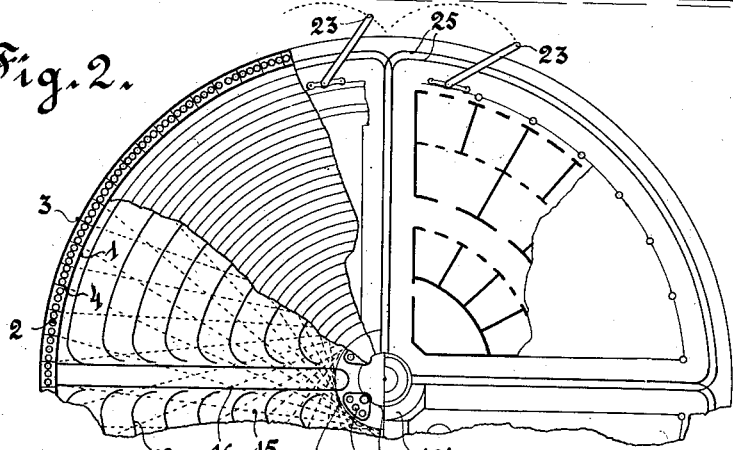

Figure 1 is a side elevation of the structure, partially in longitudinal section; Fig. 2 is a plan of the same partly in section on two different horizontal planes; Fig. 3 consists of horizontal or transverse sections on an enlarged scale of various separate parts of the structure hereinafter specifically referred to; Figs. 4, 5 and 6 consist of vertical or longitudinal sections of various separate parts of the structure, likewise on an enlarged scale; Fig. 7 is a longitudinal or vertical section of the upper part of the well and of the tower, on an enlarged scale; Fig. 8 is a transverse or horizontal section of the tower on an enlarged scale; Fig. 9 is a broken longitudinal or vertical section on an enlarged scale of the well with the weighing mechanism; and Fig. 10 is a transverse or horizontal section thereof on an enlarged scale; Fig. 11 is a side view on an enlarged scale of the hook of the chain sustaining the load in the well; Figs. 12 and 13 are respectively a side elevation and a plan both on an enlarged scale, of the load-sustaining chain with the rollers thereon; Fig. 14 is a vertical section of the chain roller on an enlarged scale; Fig. 15 is a longitudinal section of one of the intermediate rollers of the chain on an enlarged scale; Fig. 16 is a horizontal transverse sectional view of the hook of the chain; Figs. 17 and 18 are respectively a side view and a plan of the conveying hook, and Fig. 19 is a view thereof from below; Fig. 20 is a side view of the hook-like engaging device, and Fig. 21 a side view of the same in a different position; Fig. 22 is a plan of the hook-like engaging device, and Fig. 23 a plan thereof in a different position; Fig. 24 is a vertical longitudinal section through the cock for the supply and escape of compressed air from beneath the roof of the structure; and Fig. 25 is a plan of this cock; Fig. 26 is a vertical longitudinal section of the cock on another plane.

The improved floating storehouse comprises a cylindrical or polygonal structure or receptacle formed of two concentric parts 1 and 3 which are connected together by radial partition walls 4, and, between which parts there are arranged a series of tubular reservoirs 2, filled with compressed air, the degree of compression of which corresponds to the pressure of the water at the depth to which the structure is to be lowered. Between the partition walls 4 there may also be arranged tubular reservoirs 5, having chambers 6 containing compressed air for supplying submarine boats. The concentric parts 1 and 3 form the outside float of the storage chamber. The inner float is formed of the concentric parts 11 and 7 of which the latter serves as the wall or shell of a vertical well and is provided with windows or openings through which all the various operations can be effected. The space between the parts 11 and 7, with the exception of that occupied by the windows is filled with tubular reservoirs 9 containing compressed air. The entire structure is covered-in by a double roof composed of two casings 12 and 13, between which there are arranged within the concentric boundary walls tubular reservoirs 14 containing compressed air. The parts 3 and 11 are connected by metal stays. The bottom of the structure is composed of a wire network. To enable the structure to remain above the water in an upright position it is necessary to pump compressed air into the space between the tubular reservoirs 2 and 9. Within the structure there are arranged in tiers concentric rails 18 and radial rails 16 connected by switch rails 19. The rails arranged within the structure are suspended by means of rods 20 from the roof and from the main bracing or stiffening framework of the structure. The roof is crowned by a tower 104 which may be adapted to serve as a lighthouse, and, in which, as well as on the roof there are arranged rooms for the accommodation of the workmen and for the motors. On the margin of the roof there are laid down rails 25 which are connected with other rails branching off radially in the direction of the tower, and on which there run tracks 24 for carrying drums 10 containing fuel beneath the hook 45, which is suspended from rails mounted on crown-stays 46 and conveys the drum to the platform of a scale 26 the structure and purpose of which are hereinafter described. Within the tower 104 there is arranged a revolving platform 47 provided with a truck to which there are attached sprocket wheels 27 over which runs a chain 108 of the Gall type, which is provided at its ends with hook-like gripping devices or jaws 44 (Figs. 7 and 8). The hook-like jaws at the ends of the chain 108 consist of hooks 54 (Figs. 20 and 21) which are pivotally attached to the body of the engaging device 44, and which are provided with claws 55 and hooks 56 which latter engage with the edges of an inclosing sleeve 57 that can move freely upon a bar 71 having a head 72, the hooks 54 and links 53, 52, which, together with the collar 67 can be turned around, being acted upon by the springs 51.

The drums 10 (Fig. 11) consist of an outer shell and a bucket 42, the lower edge of which bucket is provided with outwardly extending flanges or lugs 114, while the shell is likewise provided with similar inwardly turned projections or lugs 115 at a suitable height from its bottom, said height depending on the depth to which the drums 10 are to be lowered. This arrangement serves to retain the bucket 42 in the shell (Fig. 11) when the shell is passed over the bucket and then rotated through a certain angle to bring the lugs 115 thereon beneath the lugs 114 of the bucket. To enable the drums 10 to be suspended from the hooks there is provided in the upper part of each shell 10 a shackle 59 provided with a head 43 and beneath it with an enlargement 63. In the upper part of the shackle 59 (Figs. 20 and 21) is provided an aperture wherein there moves a sliding rod 65 which at one end has a conical termination 66, while at its other end is a head 64 which is housed in a recess in the enlargement 63. When the drum 10 comes to rest on the rotary crane 58 the sliding rod 65 rises and lifts the inclosing device 57 which thereupon releases the hook 56 and permits the withdrawal of the hook 54 as shown in Fig. 21.

The scales 26 are intended to measure the water capacity of the drum 10. To avoid the transmission of the whole weight of the goods to the rails and to the storehouse itself, the vessels 10 are constructed in such a way that their water capacity is large. Around the vessel 42, in which are located the goods and under the drum 10 a free space is left and filled up with air which cannot be driven out when the drum 10 is lowered in water. Now, if heavier goods are placed in said vessel 42, then, in order that they should not produce too great a stress on the rails, the water capacity of the drum 10 must be increased, which is effected by taking another drum 10, having the lower edge thereof at a greater depth beneath the flanges 115 upon which the vessel 42 rests. Such a drum will displace more water and therefore its capacity will be greater. For lighter goods the drum 10 with less depth below the flanges 115, that is, drum having a smaller capacity, must be used, otherwise the drum will not sink and will not hang from the hook while under water. For minor variations in the weight of the goods it is not necessary to choose another drum, but the capacity of a given drum can be decreased. For this purpose a vessel 48 is used which, if it protrudes above water level drives off from the edges of the drum a certain quantity of air before the edge of the drum 10 sinks in the water. The higher the vessel 42 is above water the more air will be driven off and consequently so much the less will be the displacement of the drum 10. So, for lighter goods, the vessel 48 must remain above water.

For automatically placing the vessel 48 at the necessary height above water level, the vessel 48 is connected with the platform of the scale 26 and serves as a tray which is acted upon by the upward pressure of the water instead of by a weight directed downward, that is to say, the vessel 48 serves as a float which sinks in the water more and more as the weight thereon becomes greater. If the drum 10 with the vessel 42 and a weight are placed on the platform 26 of the scale, the heavier the weight, the lower will the vessel 48 sink. The movement of the platform 26 is transmitted by means of a rack $a$ and pinion $b$ to a rack $c$ to which is connected one arm of a lever 50 from the other arm of which is suspended a frame 49 carrying the floating vessel 48. When the scale is in equilibrium, the frame 49 is secured in position and the drum then hoisted from the platform 26 and lowered to the same level as that of the water around the vessel 48. In this manner, the scales 26 and the vessel 48 are intended to decrease the water capacity of the drum, within certain limits, to prevent the drum from floating. When the difference is large, it is necessary as above mentioned to take another drum 10.

The roller chain (Figs. 12, 13, 14, 15, and 16), consists of rollers 77 which run on rails and are provided with suspension devices 74 and intermediate rollers 79 connected by means of rods 80 with projection 84. The suspension device 74 with the bolt 75 is suspended from the roller 77 of the device by means of a ring 78, which is embraced by a bent portion of the plate 80 and is connected by means of plates with the bent piece of the roller 79. This roller is connected with the bent piece 83 of the left roller 77 of the chain by means of said piece 83 and the bar 82. The bent pieces of the rollers 77 are provided with projections, while the rollers 77 themselves are provided with guide plates 85. The uncoupling of the chain is effected by means of mechanism arranged on each switch rail 19 and consisting of a lever 86 which is so connected with a counterweight 88 that, upon pulling the rope 87, the lever 86 is turned in the direction of the arrow shown in Fig. 12, and engaging with the hook of the bent piece 83 lifts both this piece and the bar 82; and, the roller chain being simultaneously moved to the right the bent pieces of the left roller and the chain will be uncoupled. From the operating chamber the connecting rod 76 which liberates the head 43 from the bolt 76 of the suspension device 74 is moved upward by means of any suitable transmission device. All the positions the switch can assume are represented in the operating chamber by means of diagrams and models which are directly operated by the movements of the controlling handles and levers. The roller chain is actuated by means of controlling wheels 89 (Figs. 3 and 6) provided with fork-like teeth, and projections 110, which wheels are rotated by hollow shafts 90 to the upper ends of which, in the tower, there is attached a pointer which indicates the position of the hook 74 relative to the projections 110. The switch rails 19 are provided at both ends with guide plates 91 and the hooks 112 on the switch rails are provided with handles 111, when the switch rails are turned the ends of the outer plates 91 swing the rails 18 and direct the rollers of the chain. The switch rails are actuated from the operating chamber by means of suitable levers and connecting rods. Between the radial rails opposite to each pair of switch rails there are suspended weights 92 which by means of ropes passing over pulleys can be made to do various kinds of auxiliary work. Cranes 58 are actuated from the tower 104 by means of shafts 60 and are used for transferring the drums 10 from the engaging device 44 through the window of the wall 7 to the hook 74, electric contacts being connected with the ends of the espagnolette 61 in such manner that only the rod 59 of the tube 60 closes the espagnolette 61 for the purpose of conveying signals to the operating chamber (Figs. 17, 18, 19, 20, 3 and 6).

The raising and lowering of the structure is effected by regulating the supply of compressed air in the intermediate space 107 of the structure, this being done by means of a valve 93 (Figs. 24 to 26) provided with a plug 94 and having flanges 99 and a counterweight 100, the arrangement being such that when the chain 101 is pulled the valve 94 is rotated by which means the passage 97 is put in communication with the passage 95 through which the air passes. The valve 93, serves for the supply of air, from the reservoir of compressed air, to the internal space 107, while there is provided another similar valve by means of which the air may escape from the space 107 into the outer air.

Everything within the various compartments of the structure which is exposed to the action of the sea water is covered with an insulating layer.

The internal compartment in the structure may either be entirely filled with water or with petroleum or partially with water and partially with petroleum. In the latter case the petroleum may either fill the receptacle up to the upper edges of the windows of the highest story or it may fill the entire internal space 107, the air being first allowed to escape therefrom by means of the valve 94. In the last mentioned case the level of the petroleum will be higher than that of the surrounding ocean and the petroleum can therefore be at once transferred to the storage chambers of ships by means of siphon tubes.

The various operations required for loading the structure are effected in the following manner: A ship approaching the structure suspends a drum 10 on the crane 23 (Figs. 1 and 2) which guides it on to a truck 24 when it is seized by the hook 45 which slides along a bar secured to stays 46 and then lowered onto the platform 26 of the scales (Figs. 7, 9 and 10). The platform 17 in the tower 104 is now brought with its hoisting tackle opposite to the drum 10 and after the sprocket wheel 27 has traveled to the extent indicated by dotted lines in Fig. 7 the hooked grab 44 carrying springs 51 compressed beneath the levers 52 is lowered on to the head 43 of the drum 10, whereupon the sprocket wheel together with the drum 10 now firmly gripped by it is turned to such an extent as to bring said drum into the center of the well, when it is lowered on to the stand 48 at the water level; whereupon the lever of the scales is released and together with the stand 48 is lowered, the latter is pushed aside and the drum 10 lowered to the desired story, as indicated by the pointer connected with the chain 108, by which means it is insured that the level of the enlargement 63 shall be in accurate engagement with the level of the head of the crane 58. At this instant the crane 50 by the rotation of the hollow shaft 60 will be brought beneath the enlargement 63 and when the espagnolette 61 comes in contact with the rod 59 of the drum 10, an event indicated by the ringing of a bell, the chain 108 together with the drum 10 will be slightly lowered with the result that the segmental piece 64 which presses against the hook-like end of the crane 58 will push outward the cone 66 together with the sliding bar which raises the inclosing sleeve 57. The sleeve 57 now incloses the hook 56 with the result that the hooks 54 are pushed aside by the action of the springs 51 and release the hook-like grab 44; whereupon the crane 58, together with the drum 10 is by means of the shaft 66 inserted into the desired window (Figs. 3, 5, 6, 17, 18, 19, 20 and 21) of the well 7 when the head 43 is attached to the hook 74 (Figs. 11, 12, 16) and the jaws 75 gripping the head at the instant when the shackle 59 of the drum 10 engages with the forked tooth of the rotating wheel 89 in such manner as to cause the hooks 74 to press against the support 40. When the rope 62 is pulled the shackle 59 will become released from the espagnolette 61 whereupon by the rotation of the corresponding shaft 90 the wheel 89 together with the roller chain and the drum suspended therefrom is rotated and pushed farther along the rails to be conveyed finally by means of the movably arranged switch rails to the required concentric rails. After the first hook-like grab 44 has been removed from the drum 10, the sprocket wheel 27 is brought into contact with another drum located on the scales which is now firmly gripped by means of a second hook-like grab, and after the wheel 27 with the drum attached thereto has been moved into the center of the well this drum will be lowered in the manner already described and the hook-like grab 44 first lowered will again be released. Discharge takes place in the opposite order to that just described, the roller chains with the loading drums suspended therefrom being manipulated in accordance with instructions accurately shown on the models and diagrams kept in the operating chamber and by means of the switch rails and releasing mechanism until the drum to be unloaded is brought opposite the proper window. After this drum has then been brought by means of the crane 58 and the sprocket wheel 27 into the center of the well the hooked grab 44, the hook 54 of which, at that time, in consequence of the deflection of the spring 57 from the plates 52, is in a lowered position, is lowered toward the center of the well and as soon as the jaws 55 come in contact with the head 43 the hooks 54 are pushed apart and engage the head. Now at the same instant the chain 108 is slightly raised, the engaging sleeve 57 together with the sliding bar 65 and the cone 66 will be lowered and will thereby close the hook 56 whereupon after the crane 58 is pushed aside the chain 108 with the drum 10 attached thereto will be raised.

If it is desired to immerse the entire structure in the water it is of course necessary first horizontally to close all the openings in the tower 104, that is to say the whole space 107 which is filled with petroleum, must be insulated; moreover, the mouth of the well 7 must be protected against coming in contact with the water above the roof of the structure, in order to prevent the water from taking the place of the petroleum. All residential rooms located on the roof must likewise be hermetically sealed. When the structure is again to be raised the valve 93 must be opened, which is effected by pulling the chain 101, whereupon compressed air will flow into the space 107 and will drive out the petroleum which, in turn, will act in a similar manner upon the water, whereupon the structure will rise.

Structures of the kind described for storing goods and fuel may be of any desired size, large enough in any case to store adequate supplies of coal and petroleum, it being of course obvious that in addition to coal there may also be stored in separate drums any other kinds of goods or materials in a dry condition, such, for instance, as ammunition or the like. Structures of this kind may also serve the purpose of maritime stations, a fact of very great importance to countries having large navies but no oversea colonies or possessions. When it is designed to provide for a maritime station of the first class it is absolutely necessary to provide in addition to a very large structure a number of smaller ones arranged around it, suitable for the storage of petroleum and provided with the necessary mechanism to enable them to be immersed in the water. The tower of the structure may be so constructed as to serve as a light-house (Fig. 1) and the roof may be provided with suitable rails for starting aeroplanes (Fig. 2). Tubular reservoirs filled with compressed air may be stored in the outer float to enable submarines 113 (Fig. 1) to be supplied with compressed air.

What I claim as my invention and desire to secure by Letters Patent, is:—

1. In floating storehouses, the combination of an outer bottomless metal bell-shaped casing of large diameter, an inner metal bell-shaped casing of relatively smaller diameter, partition walls and platforms within the annular space intervening between the said casings and also between the crowns thereof, a series of tubular reservoirs positioned within the aforesaid spaces for containing compressed air, drums for the dry storage of solid or liquid matter suspended within the inner casing, and means arranged upon the roof of the structure for handling said storage drums, substantially as described.

2. In floating storehouses, the combination of an outer bottomless metal bell-shaped casing of large diameter composed of two concentrical walls, an inner metal bell-shaped casing of relatively smaller diameter composed of two concentrical walls, means connecting said inner and outer casings to form a rigid structure, reservoirs containing compressed air disposed in said casing, storage drums suspended within said casing, and means arranged within said casing for transferring said storage drums.

3. In a floating storehouse, the combination of an open bottom bell-shaped casing comprising central and peripheral walls, horizontal radial tracks extending from said central to said peripheral wall, circular tracks having switch connections with said radial tracks and arranged in concentric relation with respect to each other and with respect to said central and peripheral walls, and chain carriages for traversing said tracks.

4. In a floating storehouse, the combination of an open bottom bell-shaped casing comprising central and peripheral walls, a plurality of superposed radially disposed horizontal tracks extending from the central toward the peripheral wall, a plurality of horizontally disposed superposed circular tracks having switch connections with said radial tracks and arranged in concentric relation with respect to each other and with respect to said central and outer walls, and chain carriages for traversing said tracks.

5. In a floating storehouse, the combination of an open bottom bell-shaped casing, means within said casing for maintaining the same at the desired floating height, tracks extending around the periphery of and on the roof of said casing, radial tracks extending from said peripheral tracks toward the central portion of the roof and carriages traversing said tracks.

In witness whereof I have hereunto set my hand in the presence of two witnesses.

MICHAIL KIRILLOWITCH KIRILLOFF.

Witnesses:
 CH. RONALD MCDONELL,
 LEWIS ABRAMOVITCH.